United States Patent [19]

Maly et al.

[11] Patent Number: 5,684,091
[45] Date of Patent: Nov. 4, 1997

[54] SULFUR VULCANIZABLE RUBBER COMPOUND

[75] Inventors: Neil Arthur Maly, Tallmadge; John Robert McGilvrey, Ravenna, both of Ohio

[73] Assignee: The Goodyear Tire & Rubber Company, Akron, Ohio

[21] Appl. No.: 662,093

[22] Filed: Jun. 12, 1996

Related U.S. Application Data

[60] Provisional application No. 60/000,502, Jun. 26, 1995.
[51] Int. Cl.[6] ....................................................... C08F 8/00
[52] U.S. Cl. ..................... 525/332.5; 525/332.6; 525/332.7
[58] Field of Search ........................... 525/332.5, 332.6, 525/332.7

[56] References Cited

U.S. PATENT DOCUMENTS

| 4,326,576 | 4/1982 | Mizumoto et al. | 152/356 X |
| 4,960,833 | 10/1990 | Nagasaki et al. | 525/329.3 |
| 5,328,636 | 7/1994 | Maly et al. | 252/182.17 |

*Primary Examiner*—Edward J. Cain
*Attorney, Agent, or Firm*—Bruce J Hendricks

[57] ABSTRACT

This invention relates to the discovery that the combination of tetrabenzylthiuram disulfide, cashew nut oil modified novolak-type phenolic resin, a bismaleimide compound and a sulfenamide compound provides for excellent vulcanization of rubbers and results in desirable final rubber vulcanizate physical properties in the absence of generating undesirable nitrosamines and fumes during processing and cure.

16 Claims, No Drawings

SULFUR VULCANIZABLE RUBBER COMPOUND

This application claims the benefit of U.S. Provisional Application 60/000,502 filed Jun. 26, 1995.

BACKGROUND OF THE INVENTION

This invention relates to the vulcanization of diene elastomers. More particularly, the invention relates to an improved process for the vulcanization of diene elastomers with a significant reduction in the generation of nitrosamines and toxic/corrosive fumes during curing.

In the manufacture of rubber articles, crude or raw rubber is compounded with various ingredients among which are sulfur and accelerators of vulcanization. The primary function of an accelerator or accelerator system is to increase the rate of the vulcanization process while allowing sufficient time to mix the accelerators into the rubber at an elevated temperature before vulcanization commences. This delay before the initiation of vulcanization is commonly referred to as scorch time.

The properties of a final rubber vulcanizate that are of importance include stress strain properties and rheometer values. Other factors relating to the vulcanization which are of importance are the rate of cure, the cure time, the scorch behavior and the extent of cure. These physical properties can be altered either beneficially or detrimentally through the inclusion of chemicals or components that impact upon the rate and state of vulcanization.

Resorcinol is a common ingredient in many vulcanizable rubber compounds. Unfortunately, resorcinol has a relatively high volatility which causes undesirable fumes to be produced during curing.

Many accelerator combinations have been used in the rubber industry. Unfortunately, many of the known accelerators, such as morpholine containing accelerators, and dimethylamine containing accelerators yield volatile nitrosamines upon use. The use of accelerators which yield volatile nitrosamines have been significantly restricted in a number of countries and the need to find a suitable replacement is eminent.

SUMMARY OF THE INVENTION

The present invention relates to a vulcanizable rubber composition comprising: (a) sulfur curable rubber, (b) tetrabenzylthiuram disulfide, (c) cashew nut oil modified novolak-type phenolic resin, (d) a bismaleimide; (e) a sulfenamide compound and (f) sulfur, a sulfur donor or mixture thereof.

DETAILED DESCRIPTION OF THE INVENTION

There is disclosed a sulfur vulcanizable rubber composition comprising:

(a) a rubber selected from the group consisting of natural rubber, a rubber derived from a diene monomer and mixture thereof;

(b) from about 0.10 to about 0.75 phr of tetrabenzylthiuram disulfide;

(c) from about 1 to about 12 phr of cashew nut oil modified novolak-type phenolic resin;

(d) from about 0.5 to about 3 phr of a bismaleimide compound of the general formula:

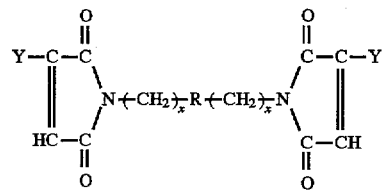

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms, wherein these divalent groups may contain a hetero atom selected from O, N and S; X is O or an integer of from 1 to 3 and Y is hydrogen or —$CH_3$;

(e) from about 0.5 phr to about 3 phr of a sulfenamide compound of the general formula:

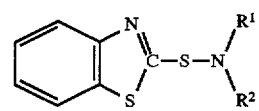

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

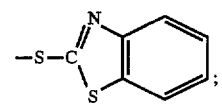

and (f) from about 0.5 to about 6 phr of sulfur, a sulfur donor or mixtures thereof.

There is also disclosed a process for the vulcanization of a rubber compound comprising heating to a temperature ranging from 125° C. to 180° C. a rubber compound comprising:

(a) a rubber selected from the group consisting of natural rubber, a rubber derived from a diene monomer and mixture thereof;

(b) from about 0.10 to about 0.75 phr of tetrabenzylthiuram disulfide;

(c) from about 1 to about 12 phr of cashew nut oil modified novolak-type phenolic resin;

(d) from about 0.5 to about 3 phr of a bismaleimide compound of the general formula:

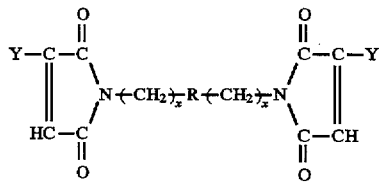

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms, wherein these divalent groups may contain a hetero atom selected from O, N and S; X is O or an integer of from 1 to 3 and Y is hydrogen or -CH3;

(e) from about 0.5 phr to about 3 phr of a sulfenamide compound of the general formula:

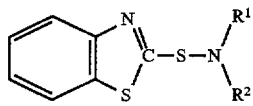

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

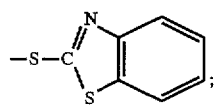

and (f) from about 0.5 to about 6 phr of sulfur, a sulfur donor or mixtures thereof.

The first essential component in the claimed invention is tetrabenzylthiuram disulfide. The tetrabenzylthiuram disulfide is present in an amount of from about 0.10 to 0.75 phr. Preferably, the tetrabenzylthiuram disulfide is present in an amount ranging from about 0.10 to about 0.50 phr.

A cashew nut oil modified novolak-type phenolic resin is the second essential component in the present invention. Such resins are commercially available from Schenectady Chemicals Inc under the designation SP-6700. The resin is present in an amount ranging from about 1 to 12 phr. Preferably, the resin is present in an amount ranging from about 5 to 9 phr. The modification rate of oil based on total novolak-type phenolic resin may range from 10 to 50 percent. For production of the novolak-type phenolic resin modified with cashew nut oil, various processes may be used. For example, phenols such as phenol, cresol and resorcin may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The bismaleimide is the third essential component in the claimed invention. The bismaleimide is generally present in an amount of from about 0.5 to 3 phr. Preferably, the bismaleimide is present in an amount ranging from about 0.65 to about 2 phr.

Representative of the bismaleimides of formula I and which may be used in the present invention include N,N'-ethylenebismaleimide, N,N'-hexamethylenebis-maleimide, N,N'-dodecamethylenebismaleimide, N,N'-(2,2,4-trimethylhexamethylene)bismaleimide, N,N'-(oxydipropylene)bismaleimide, N,N'-(aminodipropylene)-bismaleimide, N,N'-(ethylenedioxydipropylene)-bismaleimide, N,N'-(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'-(oxy-1,4-dicyclohexylene)bismaleimide, N,N'-(m-phenylene)dicyclohexylene)bismaleimide, N,N'-(m-phenylene)bismaleimide, N,N'-p-(phenylene)-bismaleimide, N,N'-(o-phenylene)bismaleimide, N,N'-(1,3-naphthylene)bismaleimide, N,N'-(1,4-naphthylene)-bismaleimide, N,N'-(1,5-naphthylene)bismaleimide, N,N-(3,3'-dimethyl-4,4'-diphenylene)bismaleimide, N,N'-(3,3-dichloro-4,4'-biphenylene)bismaleimide, N,N'-(2,4-pyridyl)bismaleimide, N,N'-(2,6-pyridyl)-bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)-bismaleimide, N,N'-(5-hydroxy-1,3-phenylene)-bismaleimide, N,N'-(5-methoxy-1,3-phenylene)-bismaleimide, N,N'-(m-xylylene)bismaleimide, N,N'-(p-xylylene)bismaleimide, N,N'-(methylenedi-p-phenylene)-bismaleimide, N,N'-(isopropylidenedi-p-phenylene)-bismaleimide, N,N'-(oxydi-p-phenylene)bismaleimide, N,N'-(thiodi-p-phenylene)bismaleimide, N,N'-(dithiodi-p-phenylene)bismaleimide, N,N'-(sulfodi-p-phenylene)-bismaleimide, N,N'-(carbonyldi-p-phenylene)-bismaleimide, α,α-bis-(4-maleimidophenyl)-meta-diisopropylbenzene, α,α-bis-(4-p-phenylene) bismaleimide, N,N'-m-xylylene-bis-citraconic imide and α,α-bis-(4-maleimidophenyl)-para-diisopropylbenzene. The preferred bismaleimide is N,N'-(m-phenylene)bismaleimide.

The sulfenamide compound of formula II is the 5 fourth essential component of the present invention. The sulfenamide is generally present in an amount of from about 0.5 to about 3 phr. Preferably, the sulfenamide is present in an amount ranging from about 0.70 to about 2.0 phr.

Representative of the sulfenamide compounds of formula II and which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, and N-t-butylbis-(2-benzothiazylsulfen)amide. Preferably, the sulfenamide compound is N-cyclohexyl-2-benzothiazylsulfenamide.

Examples of rubbers for use in the present invention include substituted and unsubstituted, saturated and unsaturated, natural and synthetic polymers. The natural polymers include natural rubber in its various forms, e.g., pale crepe and smoked sheet, and balata and gutta percha. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50% by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

The preferred rubbers which may be used with the present invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

As known to one skilled in the art, in order to cure a rubber stock, one needs to have a sulfur vulcanizing agent. Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. The sulfur vulcanizing agent is generally present in an amount ranging from about 0.5 to about 6 phr. Preferably, the sulfur vulcanizing agent is present in an amount ranging from about 0.75 phr to about 4.0 phr.

Conventional rubber additives may be incorporated in the rubber stock of the present invention. The additives commonly used in rubber stocks include fillers, plasticizers, waxes, processing oils, retarders, antiozonants, antioxidants and the like. The total amount of filler that may be used may range from about 30 to about 150 phr, with a range of from about 45 to about 100 phr being preferred. Fillers include clays, calcium carbonate, calcium silicate, titanium dioxide and carbon black. Representatives carbon blacks that are commonly used in rubber stocks include N-326, N-330, N-472, N-660, N-754, N-762, N-765 and N-990. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indane resins and esters such as dibutylphthalate and tricresol phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, stearic acid, oleic acid, murastic acid, and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

In addition to the claimed combination of accelerators that are non-nitrosamine generators, additional accelerators, preferably also non-nitrosoamine generating may be used. Such accelerators are used to control the time and/or temperatures required for vulcanization and to improve the properties of the vulcanizate. For example, as an optional secondary accelerator, N,N'-di-orthotolylguanidine or N,N'-diphenylguanidine may be used in an amount ranging from about 0.05 to 3 phr.

Siliceous pigments may be used in the rubber compound applications of the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

A class of compounding materials known as scorch retarders are commonly used. Phthalic anhydride, salicylic acid, sodium acetate and N-cyclohexyl thiophthalimide are known retarders. Retarders are generally used in an amount ranging from about 0.1 to 0.5 phr.

In-situ resins may be formed in the rubber stock and involve the reaction of cashew nut oil modified novolak-type phenolic resin and a methylene donor. The term "methylene donor" is intended to mean a compound capable of reacting with the cashew nut oil modified novolak-type phenolic resin and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

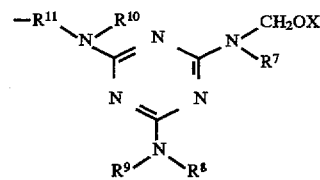

wherein X is an alkyl having from 1 to 8 carbon atoms, $R^7$, $R^8$, $R^9$, $R^{10}$ and $R^{11}$ are individually selected from the group consisting of hydrogen, an alkyl having from 1 to 8 carbon atoms, the group —CH$_2$OX or their condensation products. Specific methylene donors include hexakis-(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl) melamine and N,N'N"-tributyl-N,N',N"-trimethylolmelamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Conventionally, antioxidants and sometimes antiozonants, hereinafter referred to as antidegradants, are added to rubber stocks. Representative antidegradants include monophenols, hisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 1.0 to about 3.0 phr being preferred.

When the compound of the present invention is used as a wire coat or bead coat for use in a tire, the compound generally contains an organo-cobalt compound which serves as a wire adhesion promoter. Any of the organo-cobalt compounds known in the art to promote the adhesion of rubber to metal may be used. Thus, suitable organo-cobalt compounds which may be employed include cobalt salts of fatty acids such as stearic, palmitic, oleic, linoleic and the like; cobalt salts of aliphatic or alicyclic carboxylic acids having from 6 to 30 carbon atoms; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

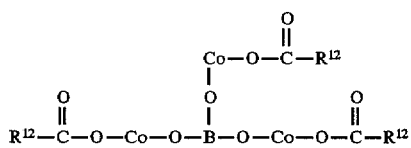

in which R$^{12}$ is an alkyl group having from 9 to 12 carbon atoms.

Amounts of organo-cobalt compound which may be employed depend upon the specific nature of the organo-cobalt compound selected, particularly the amount of cobalt metal present in the compound. Since the amount of cobalt metal varies considerably in organo-cobalt compounds which are suitable for use, it is most appropriate and convenient to base the amount of the organo-cobalt compound utilized on the amount of cobalt metal desired in the finished stock composition. Accordingly, it may in general be stated that the amount of organo-cobalt compound present in the stock composition should be sufficient to provide from about 0.01 percent to about 0.35 percent by weight of cobalt metal based upon total weight of the rubber stock composition with the preferred amounts being from about 0.03 percent to about 0.2 percent by weight of cobalt metal based on total weight of skim stock composition.

The rubber compounds of the present invention may also contain a cure activator. A representative cure activator is methyl trialkyl (C$_8$–C$_{10}$) ammonium chloride commercially available under the trademark Adogen® 464 from Sherex Chemical Company of Dublin, Ohio. The amount of activator may be used in a range of from 0.05 to 5 phr.

The sulfur vulcanizable rubber compound is cured at a temperature ranging from about 125° C. to 180° C. Preferably, the temperature ranges from about 135° C. to 160° C.

The presence and relative amounts of the above additives are not considered to be an aspect of the present invention which is more primarily directed to the utilization of specified combination of sulfur, tetrabenzylthiuram disulfide, cashew nut oil modified novolak-type phenolic resin, a bismaleimide compound and a sulfenamide compound.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The cashew nut oil modified novolak-type phenolic resin is mixed in one or more non-productive mix stages. The sulfur, tetrabenzylthiuram disulfide, bismaleimide and sulfenamide compound is generally mixed in the productive mix stage. The terms "non-productive" and "productive" mix stages are well known to those having skill in the rubber mixing art.

The rubber composition of this invention can be used for various purposes. For example, it can be used for various tire compounds. Such pneumatic tires can be built, shaped, molded and cured by various methods which are known and will be readily apparent to those having skill in such art. Preferably, the rubber composition is used as a wire coat or bead coat. As can be appreciated, the tire may be a passenger tire, aircraft tire, truck tire and the like.

The present invention may be better understood by reference to the following examples in which the parts or percentages are by weight unless otherwise indicated.

EXAMPLE 1

The rubber stock was prepared in a two non-productive, one productive Banbury mix procedure. Other than the ingredients listed in Table I, both samples contained the same conventional amount of silica, carbon black processing oil, silica coupler, ozone oxide, adhesion promoter, methylene donor, antidegradants, secondary accelerator and cure activator. Table I below shows the remaining ingredients. All parts and percentages are by weight unless otherwise noted.

TABLE I

| Sample | Control 1 | 2 |
|---|---|---|
| Nonproductive | | |
| Polyisoprene$^1$ | 40.00 | 40.00 |
| SBR$^2$ | 60.00 | 60.00 |
| Resorcinol | 5.00 | 0 |
| Cashew Nut Oil Modified Phenolic Resin$^3$ | 0 | 5.00 |
| Productive | | |
| Sulfur | 5.00 | 5.00 |

TABLE I-continued

| Sample | Control 1 | 2 |
|---|---|---|
| CHTP[4] | 0.15 | |
| NODBTS[5] | 1.00 | |
| TBBTS[6] | | 0.80 |
| Bismaleimide[7] | | 0.50 |
| TBTD[8] | | 0.20 |

[1] solution polymerized polyisoprene commercially available from The Goodyear Tire & Rubber Company under the trademark designation Natsyn ® 2200
[2] emulsion polymerized styrene butadiene commercially available from The Goodyear Tire & Rubber Company under the trademark designation Plioflex ® 1502
[3] cashew nut oil modified novolak-type phenolic resin commercially available from Schenectady Chemicals Inc under the designation SP6700.
[4] N-cyclohexylthiophthalimide
[5] N-oxydiethylene benzothiazole 2-sulfenamide
[6] N-t-butyl-2-benzothiazylsulfenamide
[7] N,N'-(m-phenylene)bismaleimide
[8] tetrabenzylthiuram disulfide Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following Table II reports cure properties that were determined from cure curves that were obtained for the rubber stocks that were prepared. These properties include a torque minimum (Min. Torque), a torque maximum (Max. Torque), minutes to 25% of the torque increase (t25), minutes to 90 percent of the torque increase (t90) and difference between the maximum torque and minimum torque (delta torque).

TABLE II

| Sample | Control 1 | 2 |
|---|---|---|
| Sulfur | 5.00 | 5.00 |
| CHTP | 0.15 | 0 |
| NOOBTS | 1.00 | 0 |
| TBBTS | 1.00 | 0.80 |
| Bismaleimide | 0 | 0.50 |
| TBTD | 0 | 0.20 |
| Resorcinol | 5.00 | 0 |
| Cashew Nut Oil Modified Phenolic Resin | 0 | 5.00 |
| Stress Strain for 40 min Cure @ 135° C. | | |
| Tensile @ Break (MPa) | 16.5 | 16.6 |
| Elongation @ Break (%) | 432 | 342 |
| 50% Modulus (MPa) | 3.4 | 4.1 |
| 100% Modulus (MPa) | 5.1 | 6.1 |
| 150% Modulus (MPa) | 7.1 | 8.6 |
| 200% Modulus (MPa) | 9.3 | 11.1 |

TABLE II-continued

| Sample | Control 1 | 2 |
|---|---|---|
| 250% Modulus (MPa) | 11.1 | 13.3 |
| Shore A Hardness @ RT | 94 | 93 |
| Stress Strain for 80 min Cure @ 135° C. | | |
| Tensile @ Break (MPa) | 17.0 | 14.8 |
| Elongation @ Break (%) | 267 | 200 |
| 50% Modulus (MPa) | 5.3 | 5.8 |
| 100% Modulus (MPa) | 8.2 | 8.7 |
| 150% Modulus (MPa) | 11.2 | 11.9 |
| 200% Modulus (MPa) | 13.8 | 14.7 |
| Shore A Hardness @ RT | 95 | 95 |
| Bead Wire Adhesion (N)* | 1010 | 913 |
| Rheometer 100 cm @ 135° C. | | |
| Max. Torque (dNm) | 90.0 | 92.4 |
| Min. Torque (dNm) | 15.3 | 14.0 |
| Delta Torque (dNm) | 74.7 | 78.4 |
| T90 (min.) | 80.6 | 87.5 |
| T25 (min.) | 15.0 | 18.4 |
| T(2) (min.) | 6.8 | 9.2 |
| Stress Strain for 40 min Cure @ 135° C. Samples Aged 7 Hours in Air Bomb at 120° C. | | |
| Tensile @ Break (MPa) | 13.2 | 13.6 |
| Elongation @ Break (%) | 192 | 154 |
| 50% Modulus (MPa) | 5.5 | 6.5 |
| 100% Modulus (MPa) | 8.4 | 10.0 |
| 150% Modulus (MPa) | 11.2 | 13.3 |
| Stress Strain for 80 min Cure @ 135° C. Samples Aged 7 Hours in Air Bomb at 120° C. | | |
| Tensile @ Break (MPa) | 13.6 | 13.3 |
| Elongation @ Break (%) | 132 | 125 |
| 50% Modulus (MPa) | 7.4 | 7.5 |
| 100% Modulus (MPa) | 11.4 | 11.4 |
| Strebler Adhesion at 95° C., 80 min cure, 10 min lag (N) | 15.2 | 12.5 |
| Bead Wire Adhesion (N)* | 959 | 889 |

*ASTM D 1871 Method 1 - Rubber Block Procedure

Control Sample 1 and Sample 2 represent a comparison between a conventional cure system which contains nitrosamine generators and volatile resorcinol (Sample 1) and Sample 2 without either nitrosamine generators or volatile resorcinol. Both samples have very similar test results except for Sample 2 having slightly greater cure state. The main advantage here is the ability to remove both nitrosamine generators and volatile resorcinol while maintaining critical properties.

EXAMPLE 2

The rubber stock was prepared in a two nonproductive, one productive mix procedure. Other than the ingredients listed in Table 3, all samples were identical to the samples of Example 1. All parts and percentages are by weight unless otherwise noted.

TABLE III

| Sample | Control 1 | 2 | 3 | 4 |
|---|---|---|---|---|
| Resorcinol | 5.00 | 0 | 0 | 0 |
| Cashew Nut Oil Modified Phenolic Resin[1] | 0 | 3.00 | 5.00 | 7.00 |
| Sulfur | 5.00 | 5.00 | 5.00 | 5.00 |
| CHTP | 0.15 | 0 | 0 | 0 |
| NODBTS | 1.00 | 0 | 0 | 0 |
| NCHBTD[2] | 0 | 0.20 | 0.20 | 0.20 |

TABLE III-continued

| Sample | Control 1 | 2 | 3 | 4 |
|---|---|---|---|---|
| Bismaleimide | 0 | 1.10 | 1.10 | 1.10 |
| TBTD | 0 | 0.30 | 0.30 | 0.30 |

[1]SP 6700
[2]N-cyclohexyl benzothiazole sulfenamide

TABLE IV

| Sample | Control 1 | 2 | 3 | 4 |
|---|---|---|---|---|
| *Rheometer 100 cpm @ 150° C.* | | | | |
| Max Torque (dNm) | 92.8 | 85.2 | 87.2 | 90.6 |
| Min Torque (dNm) | 15.6 | 16.7 | 16.9 | 17.2 |
| Delta Torque (dNm) | 77.2 | 68.5 | 70.3 | 73.4 |
| T90 (min) | 30.2 | 41.3 | 42.2 | 42.6 |
| T25 (min) | 6.0 | 9.9 | 10.0 | 9.9 |
| T2 (min) | 2.5 | 3.9 | 3.8 | 3.6 |
| *Rheometer 100 cpm @ 135° C.* | | | | |
| Max Torque (dNm) | 94.3 | 77.1 | 77.2 | 81.2 |
| Min Torque (dNm) | 17.9 | 18.0 | 18.2 | 18.8 |
| Delta Torque (dNm) | 76.4 | 59.1 | 59.0 | 62.4 |
| T90 (min) | 78.0 | 94.0 | 94.5 | 95.1 |
| T25 (min) | 15.2 | 25.3 | 26.1 | 25.0 |
| T2 (min) | 6.6 | 9.2 | 8.5 | 8.6 |
| *Stress Strain for 40 min Cure @ 135° C.* | | | | |
| Tensile @ Break (MPa) | 15.9 | 12.4 | 10.6 | 9.8 |
| Elongation @ Break (%) | 406 | 452 | 482 | 433 |
| 50% Modulus (MPa) | 3.6 | 2.5 | 2.5 | 2.7 |
| 100% Modulus (MPa) | 5.0 | 3.4 | 3.2 | 3.3 |
| 150% Modulus (MPa) | 6.9 | 4.7 | 4.2 | 4.2 |
| 200% Modulus (MPa) | 8.9 | 6.3 | 5.4 | 5.3 |
| 250% Modulus (MPa) | 10.7 | 7.9 | 6.7 | 6.5 |
| *Stress Strain for 80 min Cure @ 135° C.* | | | | |
| Tensile @ Break (MPa) | 15.4 | 17.1 | 17.1 | 16.8 |
| Elongation @ Break (%) | 274 | 338 | 330 | 318 |
| 50% Modulus (MPa) | 5.1 | 4.0 | 4.3 | 4.8 |
| 100% Modulus (MPa) | 7.8 | 6.2 | 6.5 | 6.8 |
| 150% Modulus (MPa) | 10.5 | 8.7 | 9.0 | 9.2 |
| 200% Modulus (MPa) | 13.1 | 11.4 | 11.6 | 11.5 |
| *Shore A Hardness* | | | | |
| RT (40 min cure @ 135° C.) | 83 | 86 | 86 | 88 |
| RT (80 min cure @ 135° C.) | 89 | 86 | 87 | 83 |
| Strebler Adhesion at 95° C., 80 min cure, 10 min lag (N) | 29.1 | 37.2 | 33.3 | 29.3 |
| Bead Wire Adhesion* (N) | 1095 | 972 | 1108 | 1176 |

*ASTM D 1871 Method 1 Rubber Block Procedure

The second example demonstrates the advantage of increasing levels of cashew nut oil modified-phenolic resin (SP6700). As the SP6700 was increased in steps from 3 to 7 phr, the main effect was the increasing bead wire adhesion which increased from 972 to 1176 Newtons. Example 2 also compares the control with each sample in Table IV. When control Sample 1 was compared with Sample 4, it is evident that Sample 4 cures slower, based on both Rheometer and tensile/elongation/modulus for stocks cured 40 minutes at 135° C. However, when stocks were cured 80 minutes at 135° C., both tensile and elongation for Sample 4 were both greater than Sample 1 with the modulus only slightly lower. Bead wire adhesion for Sample 4 was improved over the Sample 1 control. Thus, it is possible to remove Nitrosamine generators and volatile resorcinol and still improve tensile/elongation and wire adhesion.

What is claimed is:

1. A sulfur vulcanizable rubber compound comprising:
   (a) a rubber selected from the group consisting of natural rubber, a rubber derived from a diene monomer and mixtures thereof,
   b) from about 0.10 to about 0.75 phr of a disulfide accelerator consisting of tetrabenzylthiuram disulfide;
   (c) from about 1 to about 12 phr of a modified phenolic resin consisting of a cashew nut oil modified novolak-type phenolic resin;
   (d) from about 0.5 to about 3 phr of a bismaleimide compound of the general formula:

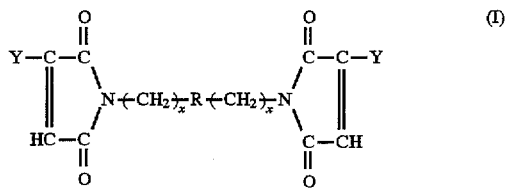

wherein R is a divalent acyclic aliphatic group having from about 2 to 16 carbon atoms, cyclic aliphatic group having from about 5 to 20 carbon atoms, aromatic group having from about 6 to 18 carbon atoms, or alkylaromatic group having from about 7 to 24 carbon atoms, wherein these divalent groups may contain a hereto atom selected from O, N and S; X is O or an integer of from 1 to 3 and Y is hydrogen or —CH$_3$ (e) from about 0.5 phr to about 3 phr of a sulfenamide compound of the general formula:

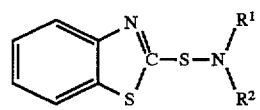

wherein R$^1$ is hydrogen, an acyclic aliphatic group having from about 1 to 10 carbon atoms, or a cyclic aliphatic group having from about 5 to 10 carbon atoms; and R$^2$ is hydrogen, a cyclic aliphatic group having from about 5 to 10 carbon atoms or a mercaptobenzothiazolyl group of the formula:

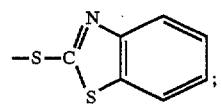

and
   (f) from about 0.5 to about 6 phr of sulfur, a sulfur donor and mixtures thereof.

2. The rubber compound of claim 1 wherein said rubber derived from a diene monomer is selected from the group consisting of natural rubber, synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

3. The rubber compound of claim 1 containing (a) from about 0.10 to 0.50 phr of tetrabenzylthiuram disulfide; (b) from about 5 to 9 phr of a cashew nut oil modified novolak-type phenolic resin; (c) from about 0.65 to 2.0 phr of a bismaleimide compound; (d) from about 0.70 to 2.0 phr of a sulfenamide compound; and (e) from about 0.75 to 2.0 phr of sulfur, a sulfur donor, and mixtures thereof.

4. The rubber compound of claim 1 wherein said bismaleimide is selected from the group consisting of N,N'-ethylenebismaleimide, N,N'-hexamethylenebismaleimide, N,N'-(m-phenylene)bismaleimide, N,N'-(p-phenylene)bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)bismaleimide, N,N'-m-xylylene-bis-citraconic imide and α,α-bis-(4-maleimidophenyl)-meta-diisopropylbenzene.

5. The rubber compound of claim 1 wherein said sulfenamide compound is selected from the group consisting of N-cyclohexyl-2-benzothiazylsulfenamide, N-isopropyl-2-benzothiazylsulfenamide, N-t-butyl-2-benzothiazylsulfenamide, N-t-butyl bis-(2-benzothiazylsulfen)amide, and N,N-dicyclohexyl-2-benzothiazylsulfenamide.

6. The rubber compound of claim 1 wherein said sulfur and sulfur donor are selected from the group consisting of elemental sulfur, an amine disulfide, polymeric polysulfide and sulfur olefin adducts.

7. The rubber compound of claim 1 in the form of a tire, hose, belt or shoe sole.

8. A process for the vulcanization of a rubber compound comprising heating to a temperature ranging from 125° C. to 180° C. a rubber compound comprising:

(a) a rubber selected from the group consisting of natural rubber, a rubber derived from a diene monomer and mixtures thereof, (b) from about 0.10 to about 0.75 phr of a disulfide accelerator consisting of tetrabenzylthiuram disulfide;

(c) from about 1 to about 12 phr of a modified phenolic resin consisting of a cashew nut oil modified novolak-type phenolic resin;

(d) from about 0.5 to about 3 phr of a bismaleimide compound of the general formula:

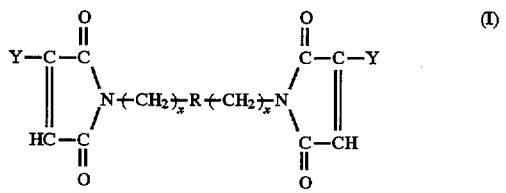

wherein R is a divalent acyclic aliphatic group having from about 2 to 16 carbon atoms, cyclic aliphatic group having from about 5 to 20 carbon atoms, aromatic group having from about 6 to 18 carbon atoms, or alkylaromatic group having from about 7 to 24 carbon atoms, wherein these divalent groups may contain a hetero atom selected from O, N and S; X is 0 or an integer of from 1 to 3 and Y is hydrogen or —CH$_3$;

(e) from about 0.5 phr to about 3 phr of a sulfenamide compound of the general formula:

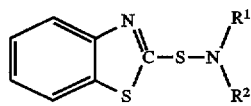

wherein R$^1$ is hydrogen, an acyclic aliphatic group having from about 1 to 10 carbon atoms, or a cyclic aliphatic group having from about 5 to 10 carbon atoms; and R$^2$ is hydrogen, a cyclic aliphatic group having from about 5 to 10 carbon atoms or a mercaptobenzothiazolyl group of the formula:

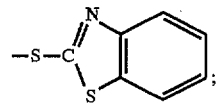

and (f) from about 0.5 to about 6 phr of sulfur, a sulfur donor and mixtures thereof.

9. The process of claim 8 wherein said rubber derived from a diene monomer is selected from the group consisting of natural rubber, synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

10. The process of claim 8 the compound comprises (a) from about 0.10 to 0.50 phr of tetrabenzylthiuram disulfide; (b) from about 0.65 to 2.0 phr of a bismaleimide compound; (c) from about 0.70 to 2.0 phr of a sulfenamide compound; and (d) from about 0.75 to 2.0 phr of sulfur, a sulfur donor, and mixtures thereof.

11. The process of claim 8 wherein said bismaleimide is selected from the group consisting of N,N'-ethylenebismaleimide, N,N'-hexamethylenebismaleimide, N,N'-(m-phenylene)bismaleimide, N,N'-(p-phenylene)bismaleimide, N,N'-(p-tolylene)bismaleimide, N,N'-(methylenedi-p-phenylene)-bismaleimide, N,N'-(oxydi-p-phenylene)bismaleimide, α,α-bis-(4-phenylene)bismaleimide, N,N'-m-xylylene-bis-citraconic imide and α,α-bis-(4-maleimidophenyl)-meta-diisopropylbenzene.

12. The process of claim 8 wherein said sulfenamide compound is selected from the group consisting of N-cyclohexyl-2-benzothiazylsulfenamide, N-isopropyl-2-benzothiazylsulfenamide, N-t-butyl-2-benzothiazylsulfenamide, N-t-butyl bis-(2-benzothiazylsulfen)amide, and N,N-dicyclohexyl-2-benzothiazylsulfenamide.

13. The process of claim 8 wherein said sulfur and sulfur donor are selected from the group consisting of elemental sulfur, an amine disulfide, polymeric polysulfide and sulfur olefin adducts.

14. A pneumatic tire containing the rubber compound of claim 1.

15. The pneumatic tire of claim 14 wherein said rubber compound of claim 1 is in the wire coat.

16. The pneumatic tire of claim 14 wherein said rubber compound of claim 1 is in the bead coat.

* * * * *